United States Patent [19]

Gravenstein et al.

[11] Patent Number: 5,799,182

[45] Date of Patent: Aug. 25, 1998

[54] MULTIPLE THREAD MICRO-SEQUENCER APPARATUS AND METHOD WITH A SINGLE PROCESSOR

[75] Inventors: Martin G. Gravenstein; Michael A. Vigil; Silvia E. Jaeckel, all of Colorado Springs, Colo.

[73] Assignee: Ford Motor Company, Dearborn, Mich.

[21] Appl. No.: 786,585

[22] Filed: Jan. 21, 1997

[51] Int. Cl.⁶ .................................................. G06F 9/30
[52] U.S. Cl. .................................... 395/595; 395/677
[58] Field of Search .............................. 395/561, 571, 395/573, 595, 598, 596, 379, 672, 677, 678

[56] References Cited

U.S. PATENT DOCUMENTS

| | | | |
|---|---|---|---|
| 5,050,070 | 9/1991 | Chastain et al. | 395/379 |
| 5,179,702 | 1/1993 | Spix et al. | 395/672 |
| 5,353,418 | 10/1994 | Nikhil et al. | 395/678 |
| 5,442,758 | 8/1995 | Slingwine et al. | 707/8 |
| 5,448,709 | 9/1995 | Chandler et al. | 395/872 |
| 5,519,867 | 5/1996 | Moeller et al. | 395/677 |

*Primary Examiner*—Parshotam S. Lall
*Assistant Examiner*—Viet Vu
*Attorney, Agent, or Firm*—Allan J. Lippa, Esq.; Roger L. May, Esq.

[57] ABSTRACT

A micro-sequencer apparatus (10) allows a plurality of threads to independently process one or several algorithms using common components by allowing each thread to execute one instruction during a cycle. A thread counter (12) identifies the current thread to allow processing of its instruction. A thread program counter (16) stores the program count or address for the current instruction for the current thread. An instruction memory (20) stores all instructions, and the program count identifies the particular instruction for processing. A processor (26) receives input information unique to the current thread and processes same with the current instruction to produce an output.

20 Claims, 2 Drawing Sheets

MULTIPLE THREAD MICRO-SEQUENCER APPARATUS AND METHOD WITH A SINGLE PROCESSOR

BACKGROUND OF THE INVENTION

1. Field of the Invention

The present invention relates, generally, to micro-sequencers for processing digital signals through a microprocessor, and more specifically for use with multiple threads for digital signal input/output functionality by a single micro-sequencer.

2. Description of the Related Art

Micro-sequencers have commonly been used to sequence through instructions and data for processor usage in a digital system, such as a computer-based system. A difficulty of multiple digital signal input/output functionality implemented by a single micro-sequencer has been the ability of the sequencer to process multiple inputs/outputs with a high degree of resolution. The resolution is generally limited by the instruction throughput of the sequencer coupled with the complexity of the input/output functions. This limitation may result in a latency to reacting to a new input/output events while processing the most current event.

Current systems allow multiple data/multiple instruction, single data/single instruction, and multiple data/single instruction processing. Multi-thread applications have been used in supercomputers with high complexity and cost for processing multiple instruction and multiple data. The term thread refers to several algorithms to execute with data, e.g., the data and instruction combination. Such multi-thread applications allow multiple data and multiple instructions to be processed through a single processor. In many of the multi-thread systems, the data is related and synchronous.

Other lower cost systems have typically dedicated a single algorithm in hardware to a single pin in a digital system. Also, in order to utilize different algorithms on the same pin, some systems have stored all potential algorithms with a pin and selection of only one of the algorithms is assigned to the pin. One disadvantage with these systems is that only one algorithm may be utilized on the input data at the pin. Also, another disadvantage is that there is wasted circuitry hardware in the case of multiple algorithms on a selected pin in that only one algorithm will be utilized.

SUMMARY OF THE INVENTION

An object of the invention is that multiple threads including different input/output functionality are processed through a single micro-sequencer and processor.

The present invention is a micro-sequencer apparatus for processing multiple threads including multiple data and multiple instructions. The apparatus includes a thread counter for identifying a current thread from a plurality of threads for producing a thread signal representative of the current thread, for determining the subsequent sequence of each of the plurality of threads for identification as the current thread, and for identifying an input signal associated with the current thread. The micro-sequencer apparatus also includes a thread program counter for storing a program count for each of the plurality of threads, the program count for the current thread being different than the program count for a subsequent thread, and for receiving the thread signal to produce the program count for the current thread. The apparatus further includes an instruction memory storing at least one algorithm having a plurality of instructions for receiving the program count to designate one of the instructions as a current instruction, and a processor for receiving the current instruction and performing the function of the current instruction with the input to produce an output.

The present invention is also a method of sequencing multiple threads including multiple data and multiple instructions. The method includes the steps of identifying a current thread from a plurality of threads producing a thread signal, and determining the subsequent sequence of the remainder of the plurality of threads for identification as the current thread. The method also includes storing a program count for each of the plurality of threads, the program count for the current thread being different than the program count for a subsequent thread. The method also includes receiving the thread signal to produce the program count for the current thread, storing at least one algorithm having a plurality of instructions, receiving the program count to designate one of the instructions as a current instruction, and receiving the current instruction and performing the function of the current instruction with input to produce an output associated with the current thread.

One advantage is that the present invention provides low data rate, complex input/output functionality with high resolution in a cost effective system. Another advantage is that the present invention allows for higher data resolution and more digital signals to be processed by a single processor of given throughput.

BRIEF DESCRIPTION OF THE DRAWINGS

The above object and advantages of the invention will be more clearly understood by reading an example of an embodiment in which the invention is used to advantage with reference to the attached drawings wherein.

DESCRIPTION OF THE PREFERRED EMBODIMENT(S)

Figure 1:
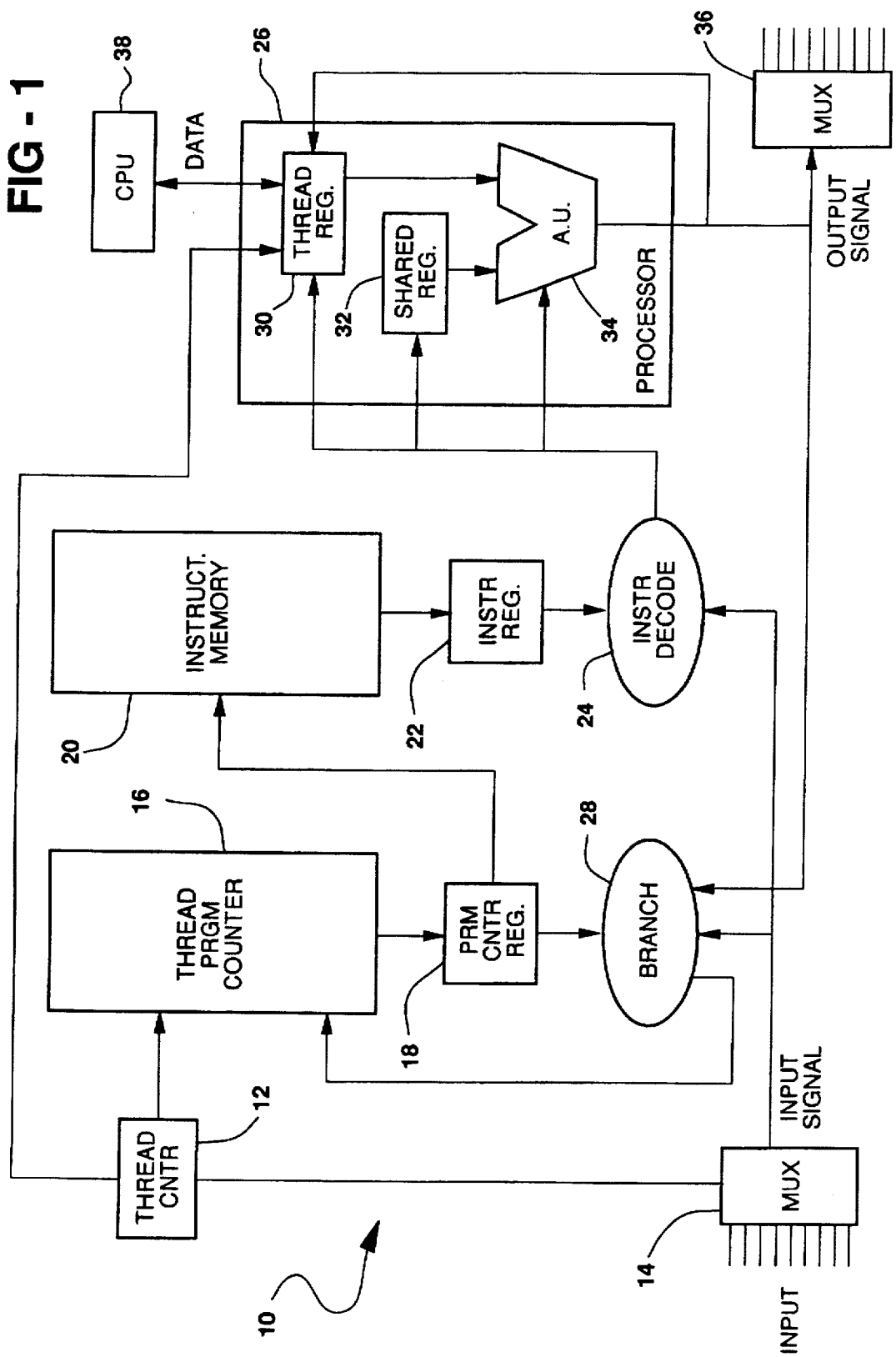
FIG. 1 is a block diagram of the micro-sequencer apparatus of the present invention.

Micro-sequencer apparatus 10 is illustrated in FIG. 1. Micro-sequencer apparatus 10 is utilized for processing multiple threads including multiple data and multiple instructions. Micro-sequencer 10 is used for low data rate input/output by using multiple threads for cost efficiency and parallelism in instruction and data processing. Each thread operates independently from the other thread and utilizes same or different algorithms for processing its own data. Micro-sequencer apparatus 10 uses multiple threads for processing input/output functions such that it may react quickly to new input/output events on each thread but then may take more time to prepare for the next input/output event within the same thread.

Micro-sequencer apparatus 10 includes thread counter 12 for identifying a current thread from a plurality of threads to produce a thread signal representative of the current thread. The identification of the current thread allows processing of the instructions and data associated therewith, which processing is often different from the remainder of threads. Thread counter 12 also determines the subsequent sequence of each of the plurality of threads for identification as subsequent current thread, and also identifies input associated with the current thread. Thread counter 12 may be a simple sequencer which continuously sequences through each of the threads in the same order, e.g., 1, 2, 3, 1, 2 . . . . Alternatively, the thread counter 12 may also be a more complex scheduling counter which bases the next thread on a defined priority or other defined sequence. In one embodiment, we will discuss the thread counter 12 as a simple sequencer which steps through each of the threads and then repeats.

Micro-sequencer apparatus 10 also includes input multiplexer 14 connected to a plurality of input signals for selecting one input signal for use in micro-sequencer apparatus 10 based on thread counter 12 and the current thread. Each thread is associated with one of the input signals of input multiplexer 14. Therefore, when it is the turn of each thread, the appropriate input signal will be transferred from input multiplexer 14 for use as subsequently discussed. It should be appreciated that more or less than one input signal may be associated with a specific thread, and thread counter 12/input multiplexer 14 may be so configured.

Micro-sequencer apparatus 10 also includes thread program counter 16 for storing a program count for each of the plurality of threads since each thread operates independently from the other threads. The program count for the current thread is generally different than the program count for a subsequent thread. Thread program counter 16 also receives the thread signal from thread counter 12 to produce the program count for the current thread.

Micro-sequencer apparatus 10 also includes program counter register 18 for storing the program count from thread program counter 16. Instruction memory 20 stores at least one algorithm having a plurality of instructions. In one embodiment, a plurality of algorithms are stored in instruction memory 20, each having a plurality of instructions. Each of the threads may be associated with different algorithms or may utilize a common algorithm. However, even when using a common algorithm, each thread may be at a different program count or instruction position. Instruction memory 20 also receives the program count to designate a current instruction. The program count provides an address to point to the current instruction in a particular algorithm in instruction memory 20. The current instruction is transferred to and stored in instruction register 22 for processing.

Instruction decoder 24 receives the instruction from instruction register 22 and also receives the associated input signal from input multiplexer 14 for the particular thread. The instruction decoder 24 decodes the current instruction and input signal for use by processor 26. Processor 26 receives the decoded current instruction and performs the function of the current instruction with the associated input signal to produce an output signal based thereon. The input may be comprised of either or both the input signal for the thread and input data, as subsequently discussed. The output may be comprised of either or both the output signal and output data, as also subsequently discussed.

The output signal from processor 26 is received by output multiplexer 36 which transfers the single output signal from processor 26 to a plurality of output signal lines, generally one for each thread. It should also be appreciated that more than one output signal may be produced by processor 26 and for each thread. Also included is central processing unit (CPU) 38 which communicates with processor 26 to provide the input data and/or obtain the output data.

Micro-sequencer apparatus 10 also includes branch logic circuit 28 for receiving the output signal, input signal, and current program count and for producing the next program count for the current thread and for storing same in thread program counter 16, which concludes operations on the current thread. Thereafter, thread counter 12 increments to the next thread for processing one of its instructions.

Processor 26 includes a plurality of thread registers 30, each being uniquely associated with one of the threads. Thread registers 30 include a plurality of registers associated with the different threads, and receive the thread signal to activate only those registers associated with the current thread. There may be one or multiple registers associated with a single thread. This allows information to be stored for a particular thread and unused by other threads. Thread registers 30 store any input data from CPU 38 to be used in subsequent processing or to be obtained by CPU 38, as required by the algorithm.

Processor 26 also includes shared registers 32 which include a plurality of registers which may be utilized during processing of any of the threads. In other words, the shared registers 32 are not associated with any particular thread and are reused during each subsequent thread processing. Therefore, information can not be stored and retrieved by a subsequent instruction of a single thread since each thread executing an instruction in a cycle may use and overwrite the register 32. These are merely temporary registers.

Processor 26 includes arithmetic unit 34 for processing the current instruction with the input signal and input data in thread registers 30, as commonly known in the art. The arithmetic unit 34 operates comparisons, additions, etc. The output of such processing may be stored in unique thread registers 30 and/or the processing result is provided as the output signal.

For example, there may be eight different threads in micro-sequencer apparatus 10. In one embodiment, thread counter 12 sequences through each of the eight threads, 1, 2, ... 7, 8, and performs one of their instructions each time, and then repeats. In this manner, each thread is allowed to execute a single instruction and then waits for the next cycle. Instruction memory 20 may include four different algorithms which are utilized by the eight threads. For example, one algorithm may determine pulse width modulation information based on an input signal, and a second algorithm may provide for delta-time determination. Each of the eight threads may use all of the algorithms with some threads using the same algorithms, or less than all of the algorithms may be used. However, it is important to note that each thread may operate at a different position in the instruction memory 20 through operating within a common algorithm, so that each thread operates independently from the remaining threads.

Figure 2:
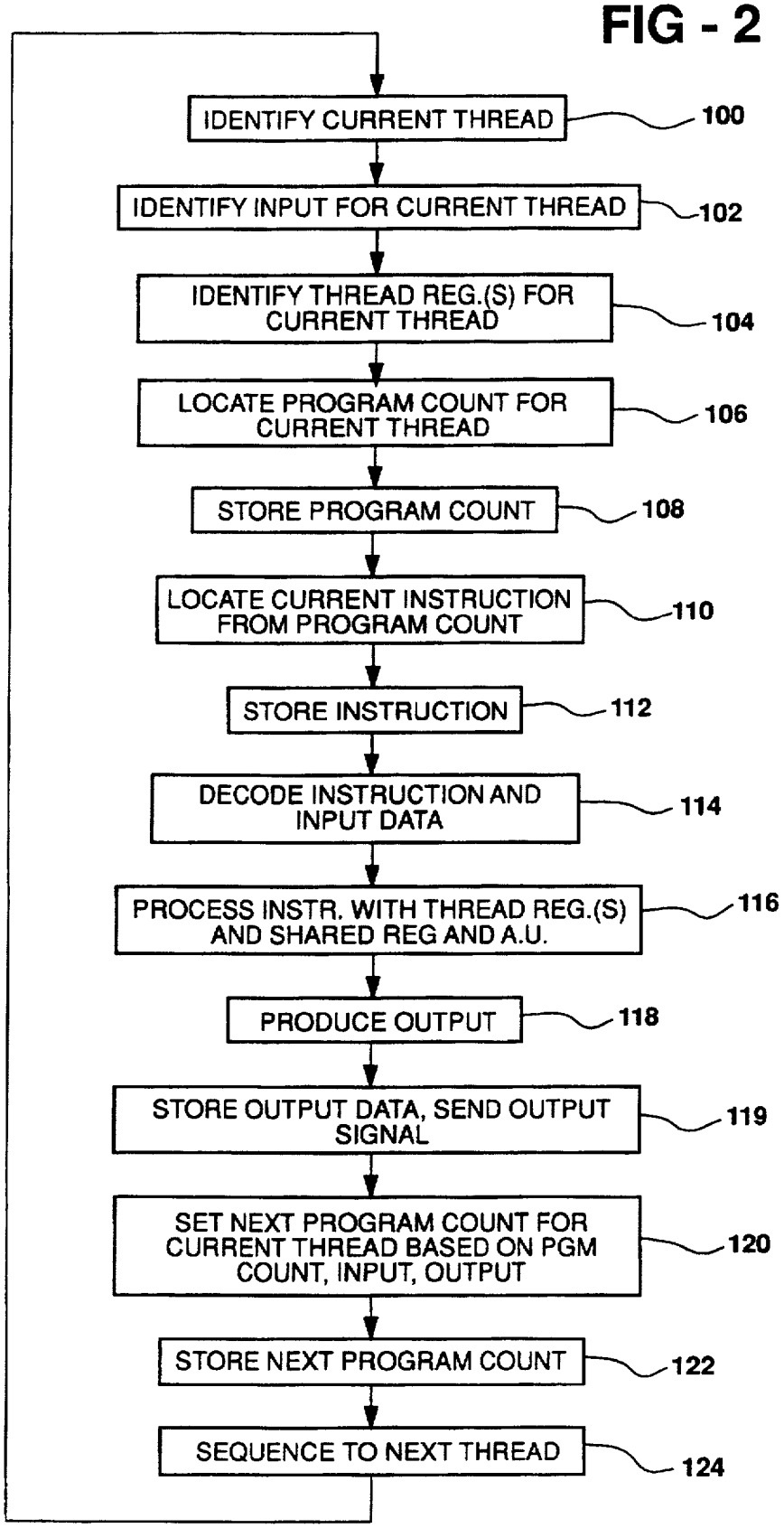
FIG. 2 is a flow chart of the micro-sequencer apparatus of FIG. 1.

FIG. 2 illustrates a flow chart of the micro-sequencer apparatus 10. The flow chart starts in block 100 where the current thread is identified. Thereafter, the associated input signal from the multiplexer 14 for the current thread is identified in block 102. Concurrently, thread registers 30 for the current thread in processor 26 are also identified in block 104. The program count of thread program counter 16 is located for the current thread in block 106. The program count is stored in the program counter register 18 in block 108. The current instruction is located in instruction memory 20 based on the program count in block 110. The instruction is stored in instruction register 22 in block 112. The instruction and input data is decoded by instruction decoder 24 in block 114. The instruction is processed with its respective thread registers 30 and shared data registers 32 and arithmetic unit 34 in block 116. The processing results in producing an output in block 118. The output data is stored in thread registers 30 and/or the output signal provided to output mix 36 in block 119. Thereafter, the next program count is set for the current thread based on the output, input and current program count by branch logic circuit 28 in block 120. The next program count is stored in thread program counter 16 in block 122. Thereafter, the next thread is sequenced in block 124 and the steps are repeated for the next thread.

The present invention is also a method of sequencing multiple threads including multiple data with multiple instructions. The method includes the steps of: identifying a current thread from a plurality of threads and producing a thread signal, determining the subsequent sequence of the remainder of the plurality of threads for identification as to current thread, identifying an input signal associated with the current thread, storing a program count for each of the plurality of threads, receiving the thread signal to produce a program count for the current thread, storing at least one algorithm having a plurality of instructions, receiving the program count to designate one of the instructions as a current instruction and receiving the current instruction with the input signal and performing the function of the current instruction to produce an output.

By assigning independent input/output functions to each thread, each function gets one instruction with its thread executed for each cycle of thread counter 12. If within the instruction an input event can be detected and/or an output event determined, then the resolution of that event is only limited to the cycle period of thread counter 12. The data rate, i.e., the rate at which the thread can be read to process the next input/output event, is then limited to the number of instructions to determine the condition of the next event multiplied by the instruction throughput of processor 26 and again multiplied by the cycle period of thread counter 12.

It should also be appreciated that the micro-sequencer apparatus 10 may be modified to execute more than one instruction during its thread's twin in the cycle. In other words, the first thread may execute two instructions, then the second thread executes two instructions, etc. Such operation may be implemented by a loop in program counter register 18 to cycle through two instructions.

Processor 26 in one embodiment is a very long instruction word process as commonly known in the art. Thread program counter 16 is typically a RAM memory. Micro-instruction memory 20 is preferably a ROM memory. Multiplexer 14, program counter register 18, instruction register 22, instruction decode 24, branch logic 28 are all shared components, i.e., each of the components are fully utilized by each thread. Except for the thread registers 30, the remainder of the processor 26 is shared by each instruction of each thread. In the shared devices, it is to be understood that no information remains therein particular to the thread after processing of the thread and instruction. These components individually are commonly known in the art, though the combination is new.

This concludes a description of an example of operation in which the invention claimed herein is used to advantage. Those skilled in the art will bring to mind many modifications and alterations to the example prescribed herein without departing from the spirit and scope of the invention. Accordingly, it is intended that the invention be limited only by the following claims:

What is claimed is:

1. A micro-sequencer apparatus for processing multi-threads including multiple data and multiple instructions in parallel on a single processor, said apparatus comprising:

a thread counter (12) for identifying a current thread from a plurality of threads for producing a thread signal representative of said current thread, each thread representing an independent process, for determining subsequent sequence of each of said plurality of threads for subsequent identification as the current thread, and for identifying an input signal associated with said current thread;

a thread program counter (16) for storing a program count for each of said plurality of threads indicating the address location of an executable instruction within the respective independent process, said program count for each current thread being different than said program count for a subsequent thread, and for receiving said thread signal to produce said program count for said current thread;

an instruction memory (20) storing at least one algorithm providing a process and having a plurality of executable instructions for receiving said program count to designate one of said plurality of instructions as a current instruction; and a processor (26) for receiving said current instruction of said current thread and performing a function of said current instruction with said input to produce an output, said processor being shared to process each of said plurality of threads.

2. A micro-sequencer apparatus as set forth in claim 1 including an instruction register (22) for storing said current instruction from said instruction memory (20).

3. A micro-sequencer apparatus as set forth in claim 2 including an instruction decoder (24) for receiving said current instruction from said instruction register (22) and decoding said current instruction with an input signal for said processor (26).

4. A micro-sequencer apparatus as set forth in claim 3 including a program register (18) for storing said program count for said instruction memory (20).

5. A micro-sequencer apparatus as set forth in claim 4 including a branch logic circuit (28) for receiving said output, said input signal and said current program count and for producing a next program count for storing in said thread program counter (16) associated with said current thread.

6. A micro-sequencer apparatus as set forth in claim 5 including an input multiplexer (14) connected to said plurality of input signals to receive said current thread and to supply one of said input signals associated with said current thread as part of said input.

7. A micro-sequencer apparatus as set forth in claim 6 including an output multiplexer (36) connecting said output signal to a plurality of output lines.

8. A micro-sequencer apparatus as set forth in claim 1 wherein said processor (26) includes a plurality of thread registers (30) associated with different of said plurality of threads to receive said thread signal and to activate only those thread registers (30) associated with said current thread to provide said input.

9. A micro-sequencer apparatus as set forth in claim 8 wherein said processor (26) further includes a plurality of shared registers (32) for storing data during processing.

10. A micro-sequencer apparatus as set forth in claim 9 wherein said processor (26) further includes an arithmetic unit (34) for processing said instructions and performing calculations on said input.

11. A method of sequencing multiple threads including multiple data and multiple instructions in parallel through a single processor, the method including the steps of:

identifying a current thread from a plurality of threads and producing a thread signal, each thread representing an independent process, determining the subsequent sequence of the remainder of the plurality of threads as for identification as the current thread, identifying an input signal associated with the current thread, storing a program count for each of the plurality of threads indicating the address location of an executable instruction within the respective process, receiving the thread signal to produce a program count for the current thread, storing at least one algorithm providing the process and having a plurality of executable instructions and receiving the program count to designate one of the instructions as a current instruction, and receiving and processing the current instruction of the current thread with the input signal to produce an output signal thereon on a single processor, each thread sharing the processor.

12. A method as set forth in claim 11 including the step of storing the program count for the current thread in a separate register.

13. A method as set forth in claim 12 including the step of storing the current instruction in a register.

14. A method as set forth in claim 13 including the step of decoding the current instruction with the input signal for processing.

15. A method as set forth in claim 14 including the step receiving the output signal, input signal, and current program count and producing the next program count for storing for the current thread.

16. A method as set forth in claim 15 including the step of receiving a plurality of input signals and supplying at least one of the input signals based on the selected current thread.

17. A method as set forth in claim 16 including the step of identifying unique registers from a plurality of registers and activating the registers associated with the current thread.

18. A method as set forth in claim 17 including the step of storing the output in the unique registers associated with the current thread.

19. A micro-sequencer apparatus for processing multi-threads including multiple data and multiple instructions, said apparatus comprising:

a thread counter (12) for identifying a current thread from a plurality of threads for producing a thread signal representative of said current thread, for determining subsequent sequence of each of said plurality of threads for subsequent identification as the current thread, and for identifying an input signal associated with said current thread;

a thread program counter (16) for storing a program count for each of said plurality of threads indicating the address of an executable instruction, said program count for each current thread being different than said program count for a subsequent thread, and for receiving said thread signal to produce said program count for said current thread;

an instruction memory (20) storing at least one algorithm having a plurality of executable instructions for receiving said program count to designate one of said plurality of instructions as a current instruction;

a processor (20) for receiving said current instruction and performing a function of said current instruction with said input to produce an output;

an input multiplexer (14) connected to a plurality of input signals to receive said current thread and to supply one of said input signals associated with said current thread as part of said input, the other of said input signals associated with the other threads.

20. A micro-sequencer apparatus as set forth in claim 19 wherein said processor (26) includes a plurality of thread registers (30) associated with different of said plurality of threads to receive said thread signal and to activate only those thread registers (30) associated with said current thread to provide said input.

* * * * *